(12) United States Patent
Huang

(10) Patent No.: US 9,176,865 B2
(45) Date of Patent: Nov. 3, 2015

(54) DATA WRITING METHOD, MEMORY CONTROLLER, AND MEMORY STORAGE DEVICE

(75) Inventor: Yi-Hsiang Huang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 456 days.

(21) Appl. No.: 13/612,843

(22) Filed: Sep. 13, 2012

(65) Prior Publication Data

US 2014/0019670 A1 Jan. 16, 2014

(30) Foreign Application Priority Data

Jul. 11, 2012 (TW) .............................. 101124957 A

(51) Int. Cl.
*G06F 12/00* (2006.01)
*G06F 12/02* (2006.01)
*G06F 3/06* (2006.01)

(52) U.S. Cl.
CPC ............ *G06F 12/0246* (2013.01); *G06F 3/064* (2013.01); *G06F 2212/7201* (2013.01); *G06F 2212/7202* (2013.01)

(58) Field of Classification Search
CPC G06F 12/0246; G06F 12/0866; G06F 12/023
See application file for complete search history.

(56) References Cited

U.S. PATENT DOCUMENTS

| | | | |
|---|---|---|---|
| 2004/0049650 A1* | 3/2004 | Ling et al. ..................... | 711/173 |
| 2005/0144358 A1* | 6/2005 | Conley et al. ................. | 711/103 |
| 2009/0193191 A1* | 7/2009 | Bae et al. ...................... | 711/115 |
| 2010/0082893 A1* | 4/2010 | Ma et al. ....................... | 711/103 |
| 2010/0223420 A1* | 9/2010 | Ahn et al. ..................... | 711/103 |
| 2010/0293321 A1* | 11/2010 | Weingarten ................... | 711/103 |

FOREIGN PATENT DOCUMENTS

TW 200601041 1/2006

OTHER PUBLICATIONS

"Office Action of Taiwan Counterpart Application", issued on Aug. 12, 2014, p. 1-p. 7.

* cited by examiner

*Primary Examiner* — Cheng-Yuan Tseng
*Assistant Examiner* — Arvind Talukdar
(74) *Attorney, Agent, or Firm* — Jianq Chyun IP Office

(57) ABSTRACT

A data writing method for controlling a rewritable non-volatile memory module having physical erasing units is provided. The physical erasing units are grouped into a first buffer area and a second buffer area. A write command instructed to write a data to a first logical address is received. Whether the quantity of the data is smaller than a predetermined value is determined. If so, the data is written into the first buffer area or the second buffer area. If the data is written into the second buffer area, at least one second logical address mapped to at least one physical programing unit in the first buffer area is obtained, and valid data belonging to the second logical address is merged, wherein the number of the second logical address is smaller than a merging threshold. Thereby, the time for a host system to wait for a write success message is shortened.

24 Claims, 8 Drawing Sheets

DATA WRITING METHOD, MEMORY CONTROLLER, AND MEMORY STORAGE DEVICE

CROSS-REFERENCE TO RELATED APPLICATION

This application claims the priority benefit of Taiwan application serial no. 101124957, filed on Jul. 11, 2012. The entirety of the above-mentioned patent application is hereby incorporated by reference herein and made a part of this specification.

BACKGROUND

1. Technology Field

The invention generally relates to a data writing method, and more particularly, to a data writing method for writing data that has a quantity smaller than a predetermined value into a rewritable non-volatile memory module, a memory controller, and a memory storage device.

2. Description of Related Art

Along with the widespread of digital cameras, cell phones, and MP3 players in recently years, the consumers' demand to storage media has increased drastically. Rewritable non-volatile memory (for example, flash memory) is very suitable for aforementioned portable multimedia devices due to its many characteristics such as data non-volatility, low power consumption, small volume, and non-mechanical structure.

Generally, a rewritable non-volatile memory module includes a plurality of physical erasing units, and these physical erasing units have to be erased before being used for writing new data. A plurality of logical addresses is mapped to part of the physical erasing units, and a host system issues commands for accessing these logical addresses to write data into the rewritable non-volatile memory module. If most physical erasing units contain data and the host system desires to write data again, valid data in the physical erasing units has to be merged to release spare physical erasing units. However, if the valid data in a physical erasing unit belongs to different logical addresses, the valid data belonging to these multiple logical addresses has to be merged to release a spare physical erasing unit. If it takes too long to merge the valid data, the time limit for the host system to wait for a write success message may be exceeded. Thereby, how to avoid merging too much valid data at each time and prevent the time for a host system to wait for a write success message from exceeding its upper limit is one of the subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Exemplary embodiments of the invention are directed to a data writing method, a memory controller, and a memory storage device, in which the time for a host system to wait for a write success message is shortened.

An exemplary embodiment of the invention provides a data writing method for controlling a rewritable non-volatile memory module. The rewritable non-volatile memory module includes a plurality of physical erasing units, each of the physical erasing units includes a plurality of physical programing units, and the physical erasing units are grouped into at least a data area. The data writing method includes configuring a plurality of logical addresses to map to the physical erasing units in the data area, grouping at least one first physical erasing unit among the physical erasing units besides the physical erasing units in the data area into a first buffer area, and grouping at least one second physical erasing unit among the physical erasing units besides the physical erasing units in the data area into a second buffer area, wherein the first physical erasing unit is different from the second physical erasing unit. The data writing method also includes receiving a first write command that instructs to write a first data to a first logical address, determining whether the quantity of the first data is smaller than a predetermined value, writing the first data into the first physical erasing unit or the second physical erasing unit if the quantity of the first data is smaller than the predetermined value, and if the first data is written into the second physical erasing unit, obtaining at least one second logical address mapped to at least one first physical programing unit in the first physical erasing unit and merging valid data belonging to the second logical address, wherein the number of the second logical address is smaller than a merging threshold.

An exemplary embodiment of the invention provides a memory storage device including a connector, a rewritable non-volatile memory module, and a memory controller. The connector is configured to couple to a host system. The rewritable non-volatile memory module includes a plurality of physical erasing units, each of the physical erasing units includes a plurality of physical programing units, and the physical erasing units are grouped into at least a data area. The memory controller is coupled to the connector and the rewritable non-volatile memory module. The memory controller configure a plurality of logical addresses to map to the physical erasing units in the data area, groups at least one first physical erasing unit among the physical erasing units besides the physical erasing units in the data area into a first buffer area, and groups at least one second physical erasing unit among the physical erasing units besides the physical erasing units in the data area into a second buffer area, wherein the first physical erasing unit is different from the second physical erasing unit. The memory controller receives a first write command that instructs to write a first data to a first logical address and determines whether the quantity of the first data is smaller than a predetermined value. If the quantity of the first data is smaller than the predetermined value, the memory controller writes the first data into the first physical erasing unit or the second physical erasing unit. If the first data is written into the second physical erasing unit, the memory controller obtains at least one second logical address mapped to at least one first physical programing unit in the first physical erasing unit and merges valid data belonging to the second logical address, wherein the number of the second logical address is smaller than a merging threshold.

An exemplary embodiment of the invention provides a memory controller including a host interface, a memory interface, and a memory management circuit. The host interface is configured to couple to a host system. The memory interface is configured to couple to a rewritable non-volatile memory module. The rewritable non-volatile memory module includes a plurality of physical erasing units, each of the physical erasing units includes a plurality of physical programing units, and the physical erasing units are grouped into at least a data area. The memory management circuit is coupled to the connector and the rewritable non-volatile memory module. The memory management circuit configures a plurality of logical addresses to map to the physical erasing units in the data area, groups at least one first physical erasing unit among the physical erasing units besides the physical erasing units in the data area into a first buffer area, and groups at least one second physical erasing unit among the physical erasing units besides the physical erasing units in the data area into a second buffer area, wherein the first physical erasing unit is different from the second physical erasing unit. The memory management circuit receives a first write command that instructs to write a first data to a first logical address and determines whether the quantity of the first data is smaller than a predetermined value. If the quantity of the first data is smaller than the predetermined value, the memory management circuit writes the first data into the first physical erasing unit or the second physical erasing unit. If the first data is written into the second physical erasing unit, the memory management circuit obtains at least one second logical address mapped to at least one first physical programing unit in the first physical erasing unit and merges valid data belonging to the second logical address, wherein the number of the second logical address is smaller than a merging threshold.

As described above, in a data writing method, a memory controller, and a memory storage device provided by embodiments of the invention, valid data in a buffer area can be merged if data having a quantity smaller than a predetermined value is written into another buffer area, so that the time for a host system to wait for a write success message is shortened.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
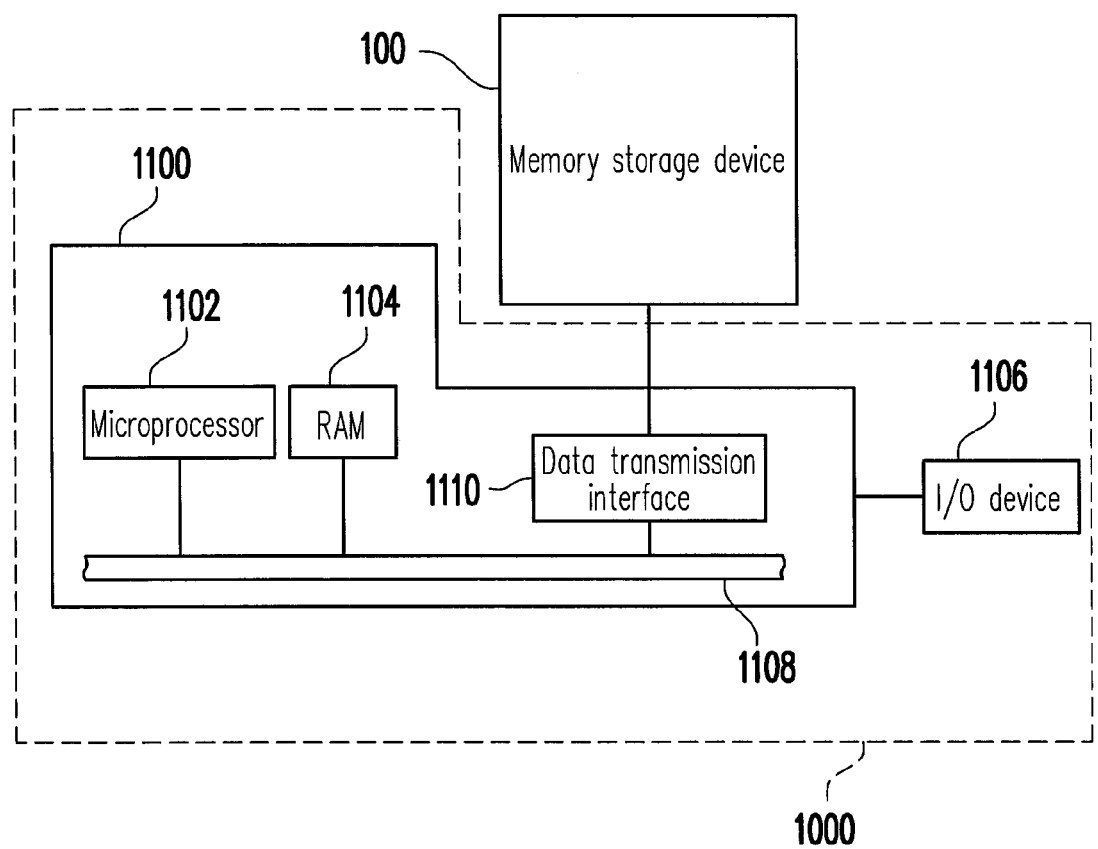
FIG. 1A illustrates a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a rewritable non-volatile memory module and a controller (also referred to as a control circuit). The memory storage device is usually used along with a host system so that the host system can write data into or read data from the memory storage device.

FIG. 1A illustrates a host system and a memory storage device according to an exemplary embodiment of the invention.

Figure 1B:
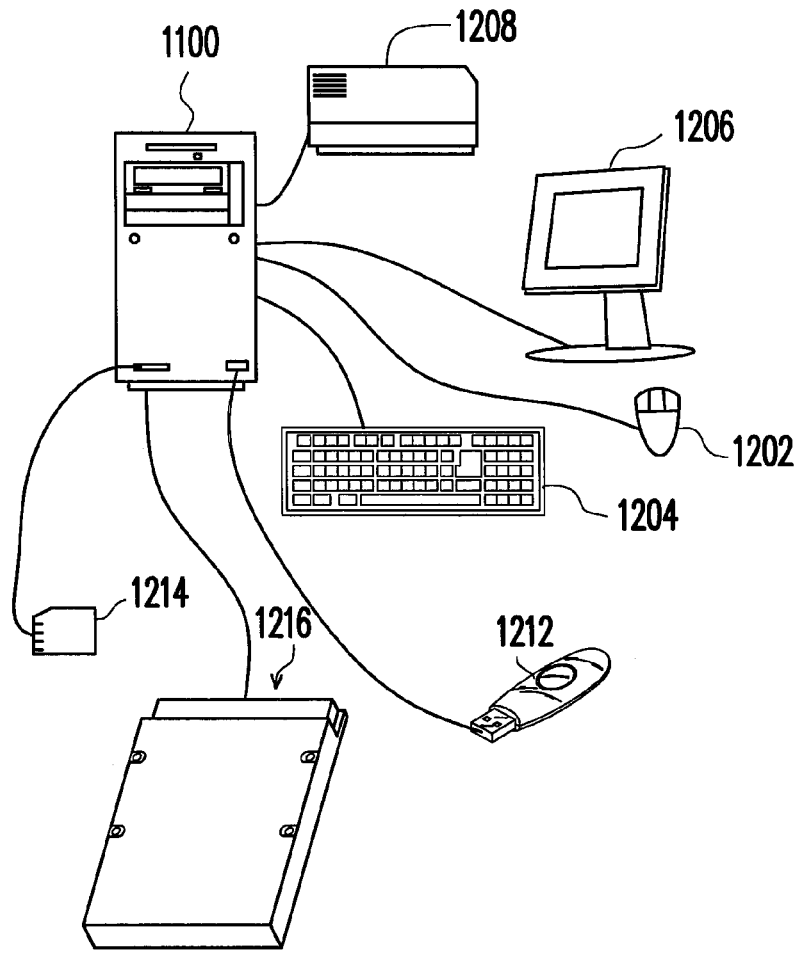
FIG. 1B is a diagram of a computer, an input/output (I/O) device, and a memory storage device according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to the devices illustrated in FIG. 1B and may further include other devices.

In the present embodiment, the memory storage device 100 is coupled to other components of the host system 1000 through the data transmission interface 1110. Data can be written into or read from the memory storage device 100 through operations of the microprocessor 1102, the RAM 1104, and the I/O device 1106. The memory storage device 100 is a rewritable non-volatile memory storage device, such as the flash drive 1212, the memory card 1214, or the solid state drive (SSD) 1216 illustrated in FIG. 1B.

Figure 1C:
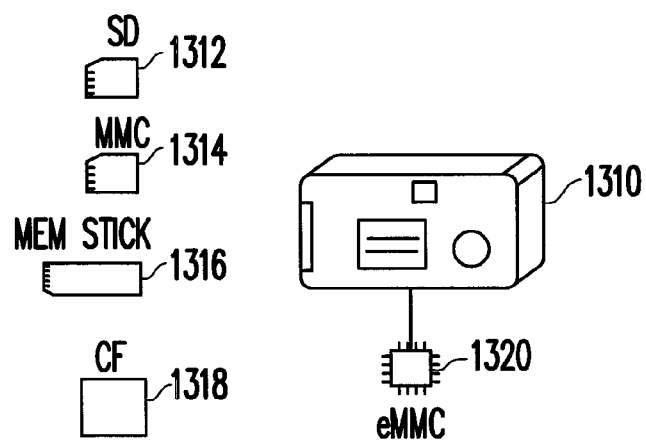
FIG. 1C is a diagram of a host system and a memory storage device according to an exemplary embodiment of the invention.

Generally speaking, the host system 1000 can be substantially any system that works with the memory storage device 100 to store data. Even tough the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that an eMMC is directly coupled to the motherboard of a host system.

Figure 2:
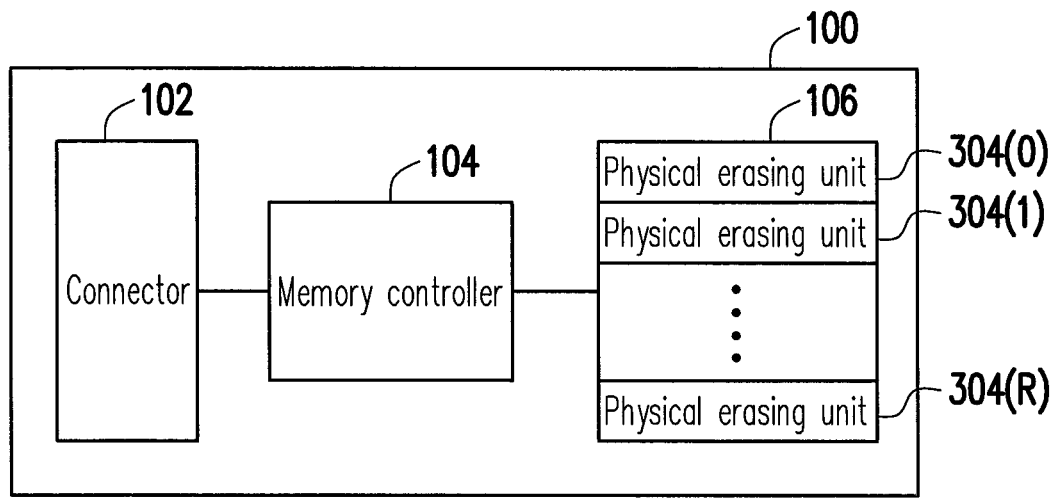
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 complies with the peripheral component interconnect (PCI) express standard. However, the invention is not limited thereto, and the connector 102 may also comply with the parallel advanced technology attachment (PATA) standard, the Institute of Electrical and Electronic Engineers (IEEE) 1394 standard, the serial advanced technology attachment (SATA) standard, the universal serial bus (USB) standard, the SD interface standard, the (ultra high speed-I) UHS-I interface standard, the ultra high speed-II (UHS-II) interface standard, the MS interface standard, the MMC interface standard, the eMMC interface standard, the universal flash storage (UFS) interface standard, the CF interface standard, the integrated device electronics (IDE) standard, or any other suitable standard.

The memory controller 104 executes a plurality of logic gates or control instructions implemented in a hardware form or a firmware form and performs various data writing, reading, and erasing operations on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has physical erasing units 304(0)-304(R). The physical erasing units 304(0)-304(R) may belong to a same memory die or different memory dies. Each physical erasing unit has a plurality of physical programing units, wherein the physical programing units belonging to the same physical erasing unit can be individually written but have to be erased all together. Each physical erasing unit may be composed of 128 physical programing units. However, the invention is not limited thereto, and each physical erasing unit may also be composed of 64, 256, or any other number of physical programing units.

To be specific, physical erasing unit is the smallest erasing unit. Namely, each physical erasing unit contains the least number of memory cells that are erased together. Physical programing unit is the smallest programming unit. Namely, physical programing unit is the smallest unit for writing data. A physical erasing unit may be a physical block, and a physical programing unit may be a physical page or a physical sector. Each physical programing unit usually includes a data bit area and a redundant bit area. The data bit area contains a plurality of physical access addresses for storing user data, and the redundant bit area is configured to store system data (for example, control information and error checking and correcting (ECC) codes). In the present exemplary embodiment, the data bit area of each physical programing unit contains 4 physical access addresses, and the size of a physical access address is 512 bytes (B). However, in other exemplary embodiments, the data bit area may also contain 8, 16, or other numbers of physical access addresses. In a word, the size and number of the physical access addresses are not limited in the invention.

In the present exemplary embodiment, the rewritable non-volatile memory module 106 is a multi level cell (MLC) NAND flash memory module (i.e., each memory cell stores a data of at least 2 bits). However, the invention is not limited thereto, and the rewritable non-volatile memory module 106 may also be a single level cell (SLC) NAND flash memory module, a trinary level cell (TLC) NAND flash memory module, any other type of flash memory module, or any other memory module having the same characteristics.

Figure 3:
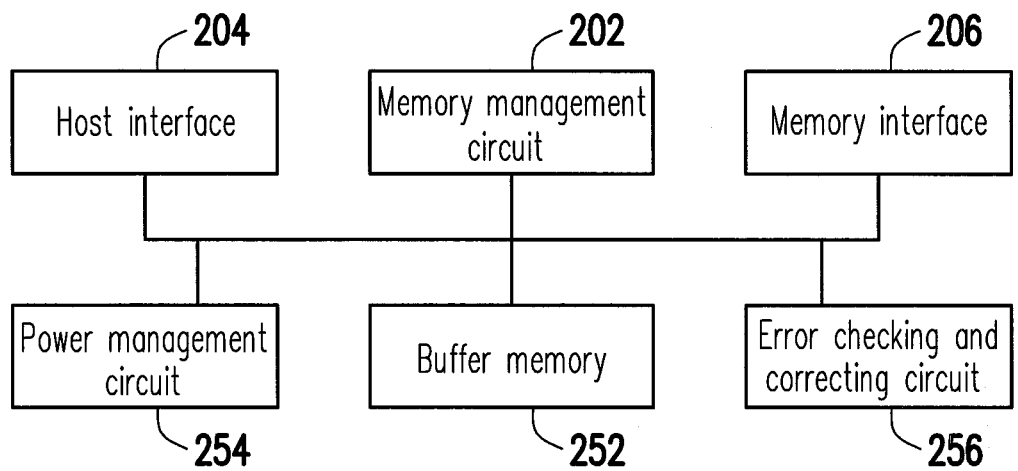
FIG. 3 is a schematic block diagram of a memory controller according to an exemplary embodiment of the invention.

FIG. 3 is a schematic block diagram of a memory controller according to an exemplary embodiment of the invention.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage device 100 is in operation, these control instructions are executed to carry out various data writing, reading, and erasing operations.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage device 100 is in operation, the control instructions are executed by the microprocessor unit to carry out various data writing, reading, and erasing operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has boot codes. When the memory controller 104 is enabled, the microprocessor unit first executes the boot codes to load the control instructions from the rewritable non-volatile memory module 106 into the RAM of the memory management circuit 202. Thereafter, the microprocessor unit runs the control instructions to perform various data writing, reading, and erasing operations.

In yet another exemplary embodiment of the invention, the control instructions of the memory management circuit 202 may also be implemented in a hardware form. For example, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage the physical erasing units of the rewritable non-volatile memory module 106. The memory writing unit is configured to issue a write command to the rewritable non-volatile memory module 106 to write data into the rewritable non-volatile memory module 106. The memory reading unit is configured to issue a read command to the rewritable non-volatile memory module 106 to read data from the rewritable non-volatile memory module 106. The memory erasing unit is configured to issue an erase command to the rewritable non-volatile memory module 106 to erase data from the rewritable non-volatile memory module 106. The data processing unit is configured to process data to be written into and read from the rewritable non-volatile memory module 106.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the PCI express standard. However, the invention is not limited thereto, and the host interface 204 may also comply with the PATA standard, the IEEE 1394 standard, the SATA standard, the USB standard, the SD standard, the UHS-I standard, the UHS-II standard, the MS standard, the MMC standard, the eMMC standard, the UFS standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 executes the ECC procedure on the data according to the ECC code.

Figure 4:
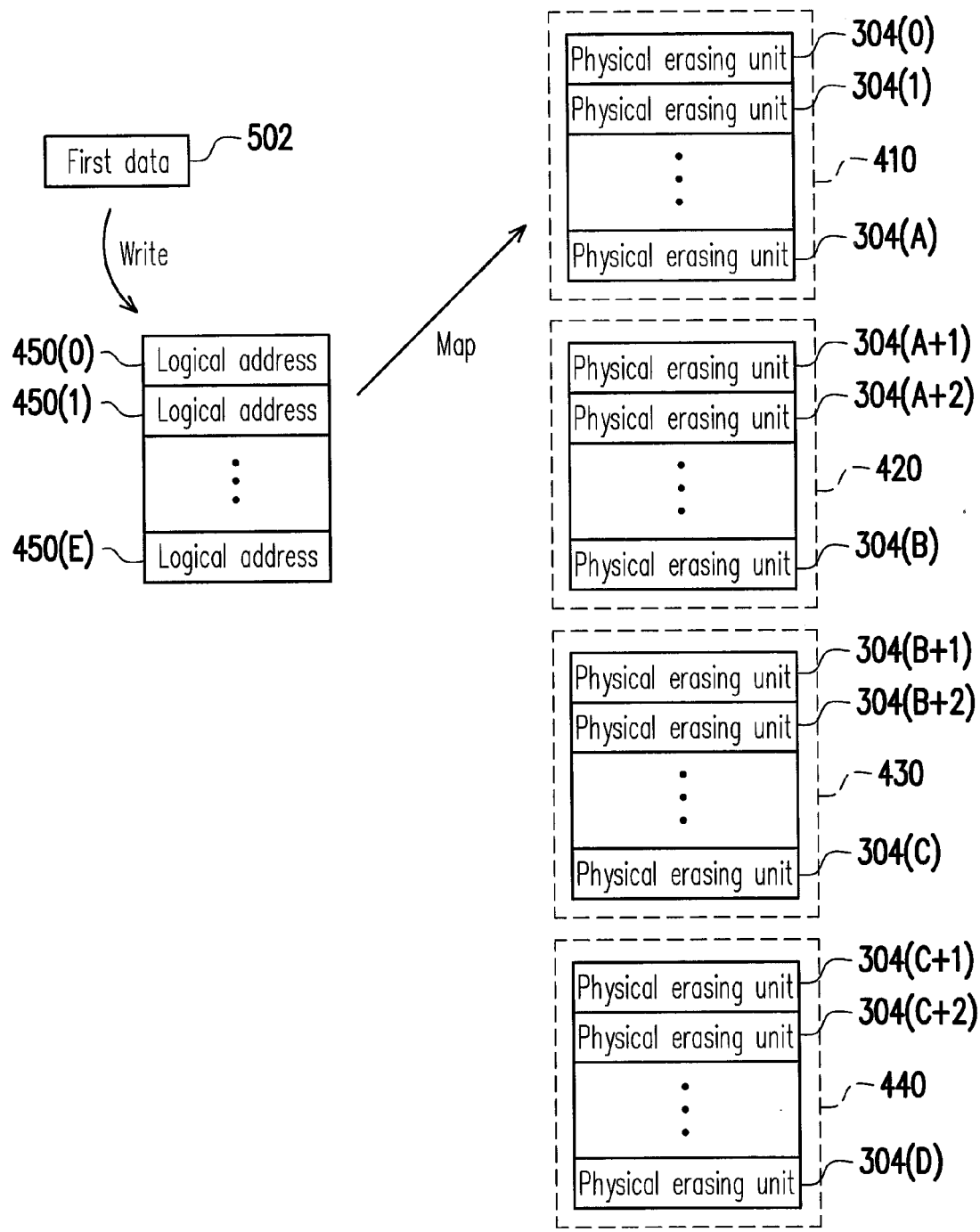
FIG. 4 is a diagram illustrating an example of managing a rewritable non-volatile memory module according to an exemplary embodiment of the invention.

FIG. 4 is a diagram illustrating an example of managing a rewritable non-volatile memory module according to an exemplary embodiment of the invention.

Referring to FIG. 4, the memory management circuit 202 logically groups the physical erasing units 304(0)-304(R) of the rewritable non-volatile memory module 106 into a plurality of areas, such as a data area 410, a spare area 420, a first buffer area 430, and a second buffer area 440.

Physical erasing units in the data area 410 and the spare area 420 are used for storing data from the host system 1000. To be specific, physical erasing units in the data area 410 are considered physical erasing units containing data, while physical erasing units in the spare area 420 are used for substituting the physical erasing units in the data area 410. Thus, the physical erasing units in the spare area 420 are either blank or available physical erasing units (i.e., no data is recorded therein or data recorded therein is marked as invalid data). Namely, erase operations have been performed on the physical erasing units in the spare area 420. Or, when a physical erasing unit in the spare area 420 is selected for storing data, an erase operation is first performed on the selected physical erasing unit. Thus, the physical erasing units in the spare area 420 are usable physical erasing units. In an exemplary embodiment, the physical erasing units in the spare area 420 may also be used for substituting damaged physical erasing units in other areas.

The first buffer area 430 includes physical erasing units 304(B+1)-304(C) (also referred to as first physical erasing units). The second buffer area 440 includes physical erasing units 304(C+1)-304(D) (also referred to as second physical erasing units). The first buffer area 430 and the second buffer area 440 are used for temporarily storing small data. For example, when the host system 1000 is about to write different data and the quantities of the data are smaller than a predetermined value, the memory management circuit 202 writes the data into the first buffer area 430 or the second buffer area 440. The memory management circuit 202 first merges the small data and then writes the merged data into physical erasing units selected from the spare area 420.

However, the memory management circuit 202 may also group the physical erasing units 304(0)-304(R) into other areas, such as a system area. Physical erasing units logically belonging to the system area are used for recording system data. Herein the system data includes the manufacturer and model of the memory chip, the number of physical erasing units in the memory chip, and the number of physical programing units in each physical erasing unit, etc. The number of areas formed by the physical erasing units 304(0)-304(R) is not limited in the invention.

The memory management circuit 202 configures a plurality of logical addresses 450(0)-450(E) to map to the physical erasing units 304(0)-304(A) in the data area 410. For example, when the memory storage device 100 is formatted by the operating system (OS) of the host system 1000 through a file system (for example, FAT 32), the logical addresses 450(0)-450(E) are respectively mapped to the physical erasing units 304(0)-304(A) in the data area 410. Herein the memory management circuit 202 establishes a logical address-physical erasing unit mapping table to record the mapping relationship between the logical addresses and the physical erasing units. In the present exemplary embodiment, the size of the memory space corresponding to a logical address is equal to the size of a physical erasing unit. Thus, a logical address may also be referred to as a logical erasing unit. Besides, each of the logical addresses 450(0)-450(E) further includes a plurality of logical programing units mapped to physical programing units. However, the size of the memory space corresponding to a logical address is not limited in the invention, and in other exemplary embodiments, the size of the memory space corresponding to each of the logical addresses 450(0)-450(E) may also be equal to the size of multiple physical erasing units, the size of a physical programing unit, or any other value.

When the host system 1000 is about to access or update data stored in the physical erasing units 304(0)-304(R), the host system 1000 issues commands for accessing the logical addresses 450(0)-450(E) to the memory management circuit 202. For example, the host system 1000 issues a write command (also referred to as a first write command). The write command instructs to write a first data 502 to the logical address 450(0) (also referred to as a first logical address). The memory management circuit 202 first determines whether the quantity of the first data 502 is smaller than a predetermined value.

If the quantity of the first data 502 is not smaller than the predetermined value, the memory management circuit 202 writes the first data 502 into a physical erasing unit selected from the spare area 420. Assuming that the first data 502 is to be written to the logical address 450(0) and the logical address 450(0) is mapped to the physical erasing unit 304(0), if the quantity of the first data 502 is not smaller than the predetermined value, the memory management circuit 202 selects the physical erasing unit 304(A+1) from the spare area 420. The memory management circuit 202 copies part of the data in the physical erasing unit 304(0) to the physical erasing unit 304(A+1) and writes the first data 502 into the physical erasing unit 304(A+1). Namely, herein valid data belonging to the logical address 450(0) is stored in the physical erasing unit 304(0) and the physical erasing unit 304(A+1). Herein the physical erasing unit 304(0) is also referred to as a mother physical erasing unit, and the physical erasing unit 304(A+1) is also referred to as a child physical erasing unit. Thereafter, the memory management circuit 202 merges valid data belonging to the logical address 450(0). Namely, the memory management circuit 202 copies valid data in the physical erasing unit 304(0) to the physical erasing unit 304(A+1), links the physical erasing unit 304(A+1) to the data area 410, links the physical erasing unit 304(0) to the spare area 420, and re-maps the logical address 450(0) to the physical erasing unit 304(A+1). Herein the valid data belonging to the logical address 450(0) is only stored in the physical erasing unit 304(A+1).

Contrarily, if the quantity of the first data 502 is smaller than the predetermined value, the memory management circuit 202 writes the first data 502 into a physical erasing unit in the first buffer area 430 or the second buffer area 440. The predetermined value may be the size of a physical programing unit in the rewritable non-volatile memory module 106. However, the invention is not limited thereto, and in other exemplary embodiments, the predetermined value may also be the size of multiple physical programing units or any other value.

If the first data 502 is written into a physical erasing unit in the second buffer area 440 (or the first buffer area 430), the memory management circuit 202 will obtain a physical programing unit in a physical erasing unit from the first buffer area 430 (or the second buffer area 440), obtain a logical address mapped to the physical programing unit, and merge valid data belonging to the logical address. In the present disclosure, the term "merge" means obtaining a plurality of physical programing units corresponding to the same logical address and writing valid data in these physical programing units into a spare physical erasing unit. Below, "merging valid data", "merging logical addresses", or "merging physical programing units" refer to the same type of operation and will not be mentioned again.

Figure 5:
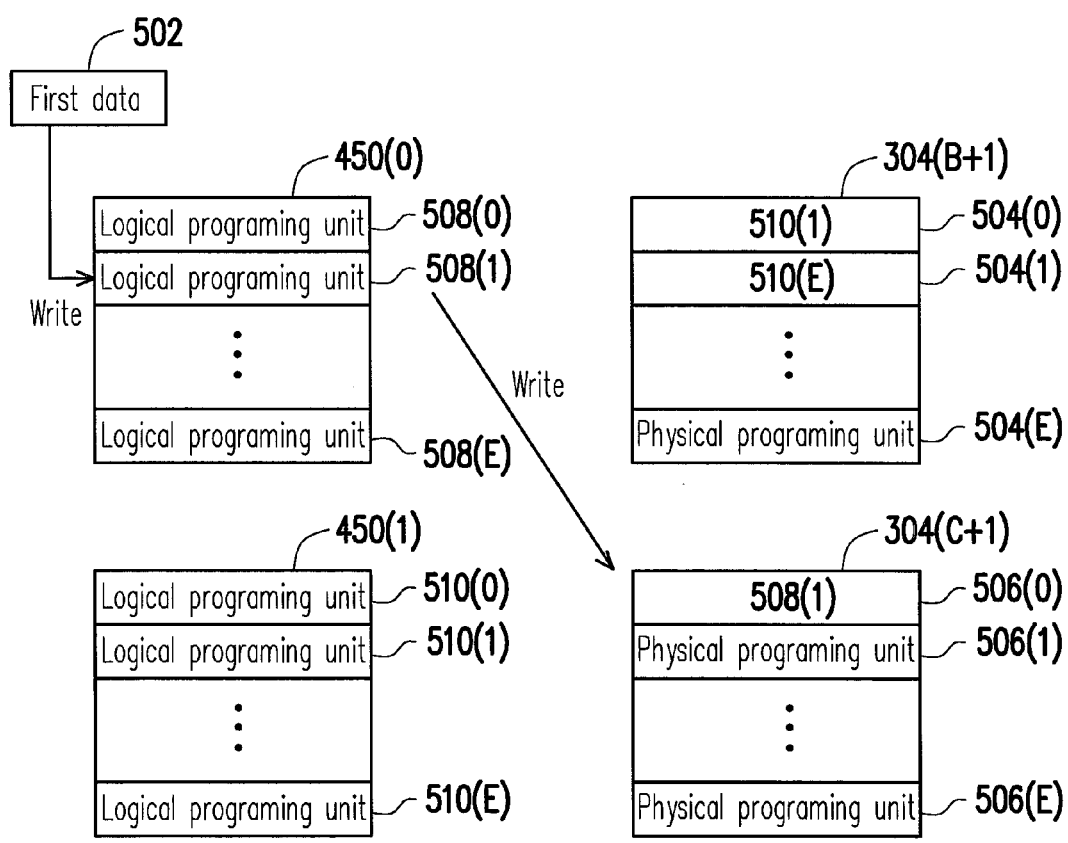
FIG. 5 is a diagram illustrating a data writing operation if a host system writes data having a quantity smaller than a predetermined value according to an exemplary embodiment of the invention.

FIG. 5 is a diagram illustrating a data writing operating if a host system writes a data having a quantity smaller than a predetermined value according to an exemplary embodiment of the invention.

Referring to FIG. 5, the logical address 450(0) includes logical programing units 508(0)-508(E), the logical address 450(1) includes logical programing units 510(0)-510(E), the physical erasing unit 304(B+1) includes physical programing units 504(0)-504(E), and the physical erasing unit 304(C+1) includes physical programing units 506(0)-506(E). Herein it is assumed that the host system 1000 is about to write the first data 502 into the logical programing unit 508(1), and the memory management circuit 202 determines that the quantity of the first data 502 is smaller than the predetermined value. The memory management circuit 202 obtains old data belonging to the logical programing unit 508(1) and adds part of the old data to the first data 502 to generate a data having the size of a physical programing unit. After that, the memory management circuit 202 writes the generated data into the physical programing unit 506(0).

The memory management circuit 202 records that the physical programing unit 506(0) contains valid data belonging to the logical programing unit 508(1) in a mapping table. In other words, the physical programing unit 506(0) is mapped to the logical programing unit 508(1) (i.e., mapped to the logical address 450(0)). Similarly, before the first data 502 is written, the physical programing unit 504(0) already contains valid data belonging to the logical programing unit 510(1), and the physical programing unit 504(1) already contains valid data belonging to the logical programing unit 510(E). Namely, both the physical programing unit 504(0) and the physical programing unit 504(1) are mapped to the logical address 450(1).

If the memory management circuit 202 writes the first data 502 into the physical programing unit 506(0), the memory management circuit 202 will obtain the logical address 450(1) (also referred to as a second logical address) mapped to the physical programing unit 504(0) (also referred to as a first physical programing unit) and merge valid data belonging to the logical address 450(1). To be specific, the memory management circuit 202 reads data stored in the physical programing units 504(0) and 504(1) and valid data belonging to the logical address 450(1) and writes the read data into a physical erasing unit selected from the spare area 420. Accordingly, all the valid data belonging to the logical address 450(1) is stored in the same physical erasing unit, and herein the data stored in the physical programing units 504(0) and 504(1) becomes invalid data. Eventually, the memory management circuit 202 sends a write success message to the host system 1000 to indicate that the memory management circuit 202 has successfully executed the write command. In other words, the memory management circuit 202 will merge valid data in the first buffer area 430 at the same time if it writes the first data 502 into the second buffer area 440. In the present exemplary embodiment, if there is no more spare physical programing unit in the second buffer area 440, there will be no more valid data in the first buffer area 430. Thus, an erase operation can be performed on the buffer areas so that the buffer areas can be used for storing data to be written by a next write command. Thereby, merging too much valid data at each time is avoided, and the time for the host system 1000 to wait for a write success message is shortened.

On the other hand, the memory management circuit 202 may also merge valid data in the physical erasing unit 304(C+1) at the same time when it writes the first data 502 into the physical erasing unit 304(B+1). In other words, the first buffer area 430 and the second buffer area 440 are alternatively used.

In an embodiment, the memory management circuit 202 sets up two pointers. These two pointers are pointed at a physical programing unit in the first buffer area 430 or the second buffer area 440. The memory management circuit 202 determines whether to write the first data 502 into the first buffer area 430 or the second buffer area 440 according to the position pointed by the two pointers.

Figure 6:
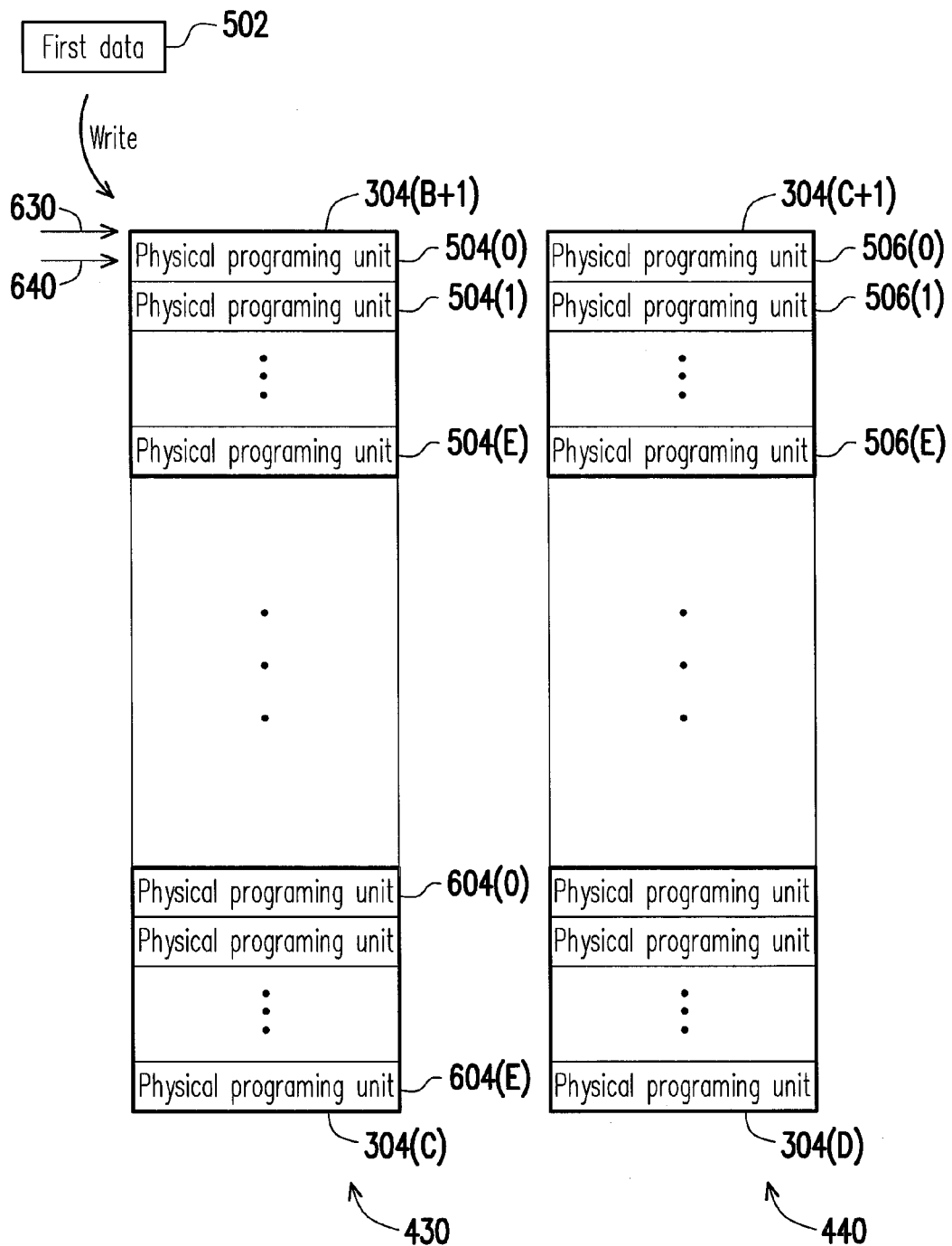
FIG. 6 and FIG. 7 are diagrams illustrating an example of writing a first data by using a first pointer and a second pointer according to an exemplary embodiment of the invention.
Figure 7:
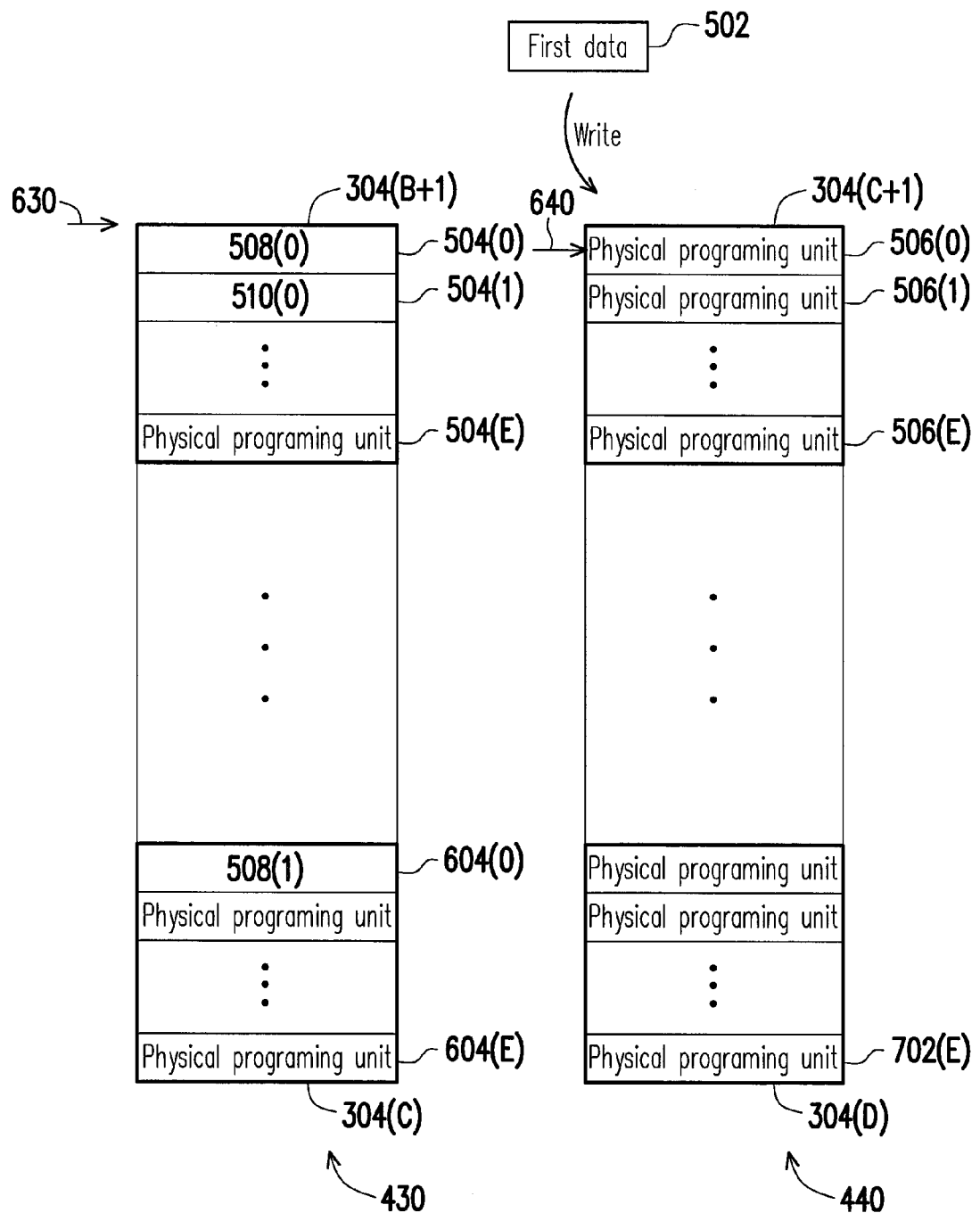

FIG. 6 and FIG. 7 are diagrams illustrating an example of writing a first data by using a first pointer and a second pointer according to an exemplary embodiment of the invention.

Referring to FIG. 6, when the memory management circuit 202 defines the first buffer area 430 and the second buffer area 440, it points a first pointer 630 and a second pointer 640 at the physical programing unit 504(0). Herein the first pointer 630 is pointed at the starting address of the valid data, and the second pointer 640 is pointed at the ending address of the valid data. During an initial phase (i.e., when no valid data is stored in the first buffer area 430 or the second buffer area 440), the first pointer 630 and the second pointer 640 are pointed at a same physical programing unit.

If the memory management circuit 202 determines that the quantity of the first data 502 is smaller than the predetermined value, it will write the first data 502 into the physical programing unit 504(0) (also referred to as a second physical programing unit) pointed by the second pointer. After writing the first data 502, the memory management circuit 202 moves the second pointer 640 to the physical programing unit 504(1) (also referred to as a third physical programing unit). Regarding the programming sequence of the physical erasing unit 304(B+1), the physical programing unit 504(1) is after the physical programing unit 504(0). Namely, the memory management circuit 202 needs to program the physical programing unit 504(0) and then the physical programing unit 504(1). If the memory management circuit 202 receives another data having a quantity smaller than the predetermined value, it will write the data into the physical programing unit 504(1). In other words, the second pointer 640 is always pointed at the physical programing unit for writing the next data having a quantity smaller than the predetermined value. After data is written into the physical programing unit 604(E) having the last programming sequence in the first buffer area 430, the memory management circuit 202 moves the second pointer 640 to the physical programing unit 506(0). In other words, in the exemplary embodiment illustrated in FIG. 6, the memory management circuit 202 sets up a programming sequence such that the second pointer 640 can be moved from the physical programing unit having the last programming sequence in a buffer area to the physical programing unit having the first programming sequence in another buffer area.

Once the second pointer 640 is pointed at the physical programing unit 506(0) (i.e., there is no more spare physical programing unit in the first buffer area 430), the memory management circuit 202 uses the physical erasing units in the second buffer area 440 for storing any data having its quantity smaller than the predetermined value and merges valid data in the first buffer area 430. To perform a merging operation, the memory management circuit 202 obtains at least one physical programing unit (also referred to as a first physical programing unit) according to the physical programing unit pointed by the first pointer 630. The first physical programing unit stores the valid data to be merged. Next, the memory management circuit 202 moves the first pointer 630 to the next physical programing unit (also referred to as a fourth physical programing unit). The memory management circuit 202 obtains the logical address (also referred to as a third logical address) mapped to the fourth physical programing unit and merges the valid data belonging to the third logical address.

Referring to FIG. 7, herein it is assumed that the second pointer 640 is already moved by the memory management circuit 202 to the physical programing unit 506(0), the first pointer 630 is pointed at the physical programing unit 504(0), the physical programing unit 504(0) stores valid data belonging to the logical programing unit 508(0), the physical programing unit 504(1) stores valid data belonging to the logical programing unit 510(0), and the physical programing unit 604(0) stores valid data belonging to the logical programing unit 508(1). If the memory management circuit 202 receives the first data 502 and determines that the quantity of the first data 502 is smaller than the predetermined value, the memory management circuit 202 will write the first data 502 into the physical programing unit 506(0) pointed by the second pointer 640. Herein the memory management circuit 202 also obtains the physical programing unit 504(0) pointed by the first pointer 630, obtains the logical programing unit 508(0) mapped to the physical programing unit 504(0), and then obtains the logical address 450(0) corresponding to the logical programing unit 508(0). The memory management circuit 202 obtains valid data belonging to the logical address 450(0) from the first buffer area 430 (stored in the physical programing unit 504(0) and the physical programing unit 604(0)). After that, the memory management circuit 202 merges the valid data belonging to the logical address 450(0). To be specific, the memory management circuit 202 reads the valid data belonging to the logical address 450(0), writes all the data into a physical erasing unit selected from the spare area 420, and then maps the logical address 450(0) to the physical erasing unit.

After the valid data belonging to the logical address 450(0) is merged, the data stored in the physical programing units 504(0) and 604(0) becomes invalid. The memory management circuit 202 moves the first pointer 630 to the physical programing unit 504(1) (also referred to as a fifth physical programing unit). In an embodiment, the memory management circuit 202 may also continue to merge valid data belonging to the logical address mapped to the physical programing unit 504(1) before receiving the next write command. Namely, the memory management circuit 202 may merge valid data belonging to multiple logical addresses at each time. However, the operation of merging the valid data belonging to the logical address mapped to the physical programing unit 504(1) is similar to the operation of merging the valid data belonging to the logical address mapped to the physical programing unit 504(0) therefore will not be described herein. After merging the valid data belonging to the logical address mapped to the physical programing unit 504(1), the memory management circuit 202 sends a write success message to the host system 1000. After that, the memory management circuit 202 receives a next write command from the host system 1000.

After the memory management circuit 202 moves the first pointer 630, if valid data in the physical programing unit pointed by the first pointer 630 is already merged, the memory management circuit 202 moves the first pointer 630 to the next physical programing unit containing unmerged valid data to merge the valid data, or the memory management circuit 202 points the first pointer 630 to those processed physical programing units in sequence and does not perform any merging operation. For example, when the first pointer 630 is moved to the physical programing unit 504(1), if the valid data in the physical programing unit 504(1) is already merged, the memory management circuit 202 moves the first pointer 630 to the physical programing unit (also referred to as a sixth physical programing unit) having its programming sequence following that of the physical programing unit 504(1).

On the other hand, when the first pointer 630 is pointed at the physical programing unit 604(E) having the last programming sequence in the first buffer area 430, the memory management circuit 202 points the first pointer 630 at the physical programing unit 506(0) having the first programming sequence in the second buffer area 440 after the second pointer 640 is pointed at the last physical programing unit 702(E) in the second buffer area 440. Namely, the memory management circuit 202 moves the first pointer 630 from the first buffer area 430 to the second buffer area 440 after the second buffer area 440 is full.

It should be noted that the number of logical addresses to be merged by the memory management circuit 202 between two write commands is smaller than a merging threshold. The memory management circuit 202 sets the merging threshold according to the time limit for the host system 1000 to wait for a write success message and the time required for performing a merging operation. For example, if the time limit for the host system 1000 to wait for a write success message is increased, the merging threshold can be set to a greater value. Or, if the write speed of the physical erasing units 304(0)-304(R) is increased, the time required by the memory management circuit 202 for performing a merging operation is shortened, and accordingly the merging threshold can be set to a greater value. The merging threshold may be 10. However, the value of the merging threshold is not limited in the invention.

In other words, in the exemplary embodiment illustrated in FIG. 6 and FIG. 7, the second pointer 640 is always pointed at the physical programing unit for writing the first data 502, and the physical programing unit pointed by the first pointer 630 contains data to be merged by the memory management circuit 202.

In the present exemplary embodiment, the size of the first buffer area 430 is the same as the size of the second buffer area 440. However, the invention is not limited thereto, and in other exemplary embodiments, the size of the first buffer area 430 may also be different from the size of the second buffer area 440. Or, in other exemplary embodiment, the memory management circuit 202 configures a plurality of buffer areas, alternatively writes data having quantities smaller than the predetermined value into these buffer areas, and alternatively merges valid data in these buffer areas. The number of the buffer areas is not limited in the invention.

Figure 8:
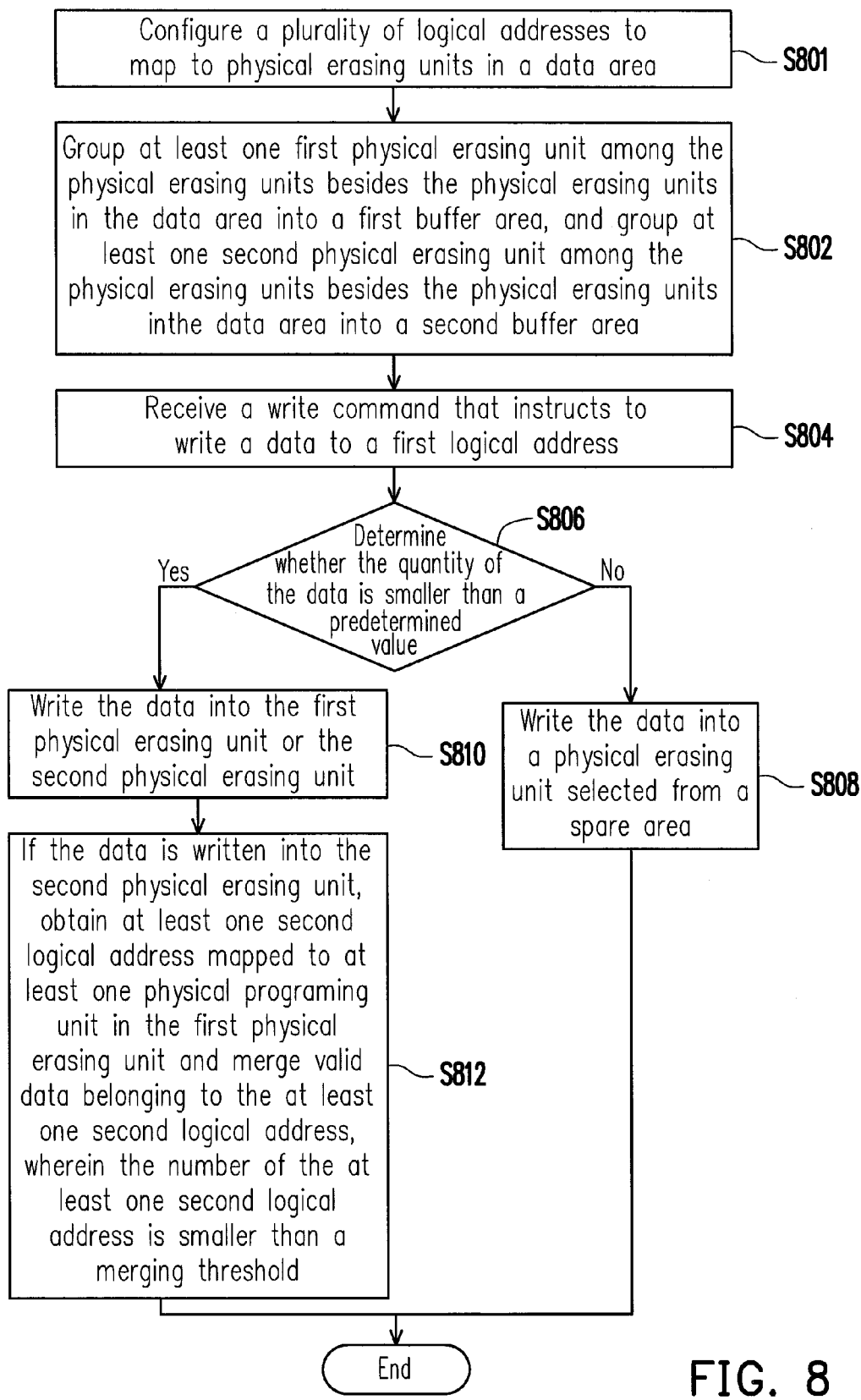
FIG. 8 is a flowchart of a data writing method according to an exemplary embodiment of the invention.

FIG. 8 is a flowchart of a data writing method according to an exemplary embodiment of the invention.

Referring to FIG. 8, in step S801, the memory management circuit 202 configures a plurality of logical addresses to map to physical erasing units in a data area. In step S802, the memory management circuit 202 groups at least one first physical erasing unit among the physical erasing units besides the physical erasing units in the data area into a first buffer area and groups at least one second physical erasing unit among the physical erasing units besides the physical erasing units in the data area into a second buffer area. In step S804, the memory management circuit 202 receives a write command that instructs to write a data to a first logical address. In step S806, the memory management circuit 202 determines whether the quantity of the data is smaller than a predetermined value.

If the quantity of the data is not smaller than the predetermined value, in step S808, the memory management circuit 202 writes the data into a physical erasing unit selected from a spare area.

If the quantity of the data is smaller than the predetermined value, in step S8010, the memory management circuit 202 writes the data into the first physical erasing unit or the second physical erasing unit. In step S812, if the data is written into the second physical erasing unit, the memory management circuit 202 obtains at least one second logical address mapped to at least one physical programing unit in the first physical erasing unit and merges valid data belonging to the at least one second logical address, wherein the number of the at least one second logical address is smaller than a merging threshold.

Various steps in FIG. 8 have been described above in detail therefore will not be described herein.

As described above, in a data writing method, a memory controller, and a memory storage device provided by embodiments of the invention, a plurality of buffer areas is defined, and if a data having a quantity smaller than a predetermined value is written into one of the buffer areas, valid data in other buffer areas is merged. Thereby, merging too much valid data when a specific write command is executed is avoided, and accordingly the time for a host system to wait for a write success message is shortened.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for a rewritable non-volatile memory module, wherein the rewritable non-volatile memory module comprises a plurality of physical erasing units, each of the physical erasing units comprises a plurality of physical programing units, and the physical erasing units are grouped into at least a data area, the data writing method comprising:

configuring a plurality of logical addresses to map to the physical erasing units in the data area; grouping at least one physical erasing unit among the physical erasing units besides the physical erasing units in the data area into a first buffer area;

and grouping at least one physical erasing unit among the physical erasing units besides the physical erasing units in the data area into a second buffer area, wherein the at least one physical erasing unit of the first buffer area is different from the at least one physical erasing unit of the second buffer area;

receiving a first write command, wherein the first write command instructs to write a first data to a first logical address among the logical addresses;

determining whether a quantity of the first data is smaller than a predetermined value;

if the quantity of the first data is smaller than the predetermined value, writing the first data into the at least one physical erasing unit of the first buffer area or the at least one physical erasing unit of the second buffer area; and if the first data is written into the at least one second physical erasing unit of the second buffer area, obtaining at least one second logical address mapped to at least one first physical programing unit in the at least one first physical erasing unit of the first buffer area, and copying merging valid data belonging to the at least one second logical address into a third physical erasing unit among the physical erasing units, wherein the number of the at least one second logical address is smaller than a merging threshold number and the third physical erasing unit is different from the at least one physical erasing unit of the first buffer area and the at least one physical erasing unit of the second buffer area.

2. The data writing method according to claim 1, wherein the step of grouping the at least one physical erasing unit among the physical erasing units into the first buffer area and grouping the at least one physical erasing unit among the physical erasing units into the second buffer area comprises:

setting up a first pointer and a second pointer, and pointing the first pointer and the second pointer at one of the physical programing units in the at least one physical erasing unit of the first buffer area or the at least one physical erasing unit of the second buffer area.

3. The data writing method according to claim 2, wherein the step of writing the first data into the at least one physical erasing unit of the first buffer area or the at least one physical erasing unit of the second buffer area if the quantity of the first data is smaller than the predetermined value comprises:

writing the first data into a second physical programing unit pointed by the second pointer; and moving the second pointer to a third physical programing unit, wherein programming sequence of the third physical programing unit follows the second physical programing unit.

4. The data writing method according to claim 2, wherein the step of obtaining the at least one second logical address mapped to the at least one first physical programing unit in the at least one physical erasing unit of the first buffer area if the first data is written into the at least one physical erasing unit of the second buffer area comprises:

obtaining the at least one first physical programing unit according to a physical programing unit pointed by the first pointer; and moving the first pointer to a fourth physical programing unit, and obtaining a third logical address mapped to the fourth physical programing unit.

5. The data writing method according to claim 4, wherein the step of merging the valid data belonging to the at least one second logical address comprises:

merging valid data belonging to the third logical address; and moving the first pointer to a fifth physical programing unit, wherein programming sequence of the fifth physical programing unit follows the fourth physical programing unit.

6. The data writing method according to claim 5 further comprising:

after data in the fifth physical programing unit is merged, moving the first pointer to a sixth physical programing unit, wherein programming sequence of the sixth physical programing unit follows the fifth physical programing unit; and if the first pointer is pointed at a physical programing unit having last programming sequence in the first buffer area, determining whether the second pointer is pointed at a physical programing unit having last programming sequence in the second buffer area, and if the second pointer is pointed at the physical programing unit having the last programming sequence in the second buffer area, moving the first pointer to a physical programing unit having first programming sequence in the second buffer area.

7. The data writing method according to claim 1, wherein the predetermined value is a size of one of the physical programing units.

8. The data writing method according to claim 1, wherein a size of the first buffer area is equal to a size of the second buffer area.

9. A memory storage device, comprising:

a connector, configured to couple to a host system; a rewritable non-volatile memory module, comprising a plurality of physical erasing units, wherein each of the physical erasing units comprises a plurality of physical programming units, and the physical erasing units are grouped into at least a data area; and a memory controller, coupled to the connector and the rewritable non-volatile memory module, wherein the memory controller is configured to configure a plurality of logical addresses to map to the physical erasing units in the data area, group at least one physical erasing unit among the physical erasing units besides the physical erasing units in the data area into a first buffer area, and group at least one physical erasing unit among the physical erasing units besides the physical erasing units in the data area into a second buffer area, wherein the at least one physical erasing unit of the first buffer area is different from the at least one physical erasing unit of the second buffer area, wherein the memory controller is configured to receive a first write command, wherein the first write command instructs to write a first data to a first logical address among the logical addresses, and the memory controller determines whether a quantity of the first data is smaller than a predetermined value, if the quantity of the first data is smaller than the predetermined value, the memory controller is configured to write the first data into the at least one physical erasing unit of the first buffer area or the at least one physical erasing unit of the second buffer area, if the memory controller writes the first data into the at least one second physical erasing unit of the second buffer area, the memory controller is configured to obtain at least one second logical address mapped to at least one first physical programing unit in the at least one physical erasing unit of the first buffer area and copy valid data belonging to the at least one second logical address into a third physical erasing unit among the physical erasing units, wherein the number of the at least one second logical address is smaller than a merging threshold number and the third physical erasing unit is different from the at least one physical erasing unit of the first buffer area and the at least one physical erasing unit of the second buffer area.

10. The memory storage device according to claim 9, wherein the memory controller is further configured to set up a first pointer and a second pointer and point the first pointer and the second pointer at one of the physical programing units in the at least one physical erasing unit of the first buffer area or the at least one physical erasing unit of the second buffer area.

11. The memory storage device according to claim 10, wherein if the quantity of the first data is smaller than the predetermined value, the memory controller is further configured to write the first data into a second physical programing unit pointed by the second pointer and move the second pointer to a third physical programing unit, wherein programming sequence of the third physical programing unit follows the second physical programing unit.

12. The memory storage device according to claim 10, wherein the memory controller is further configured to obtain the at least one first physical programing unit according to a physical programing unit pointed by the first pointer, move the first pointer to a fourth physical programing unit, and obtain a third logical address mapped to the fourth physical programing unit.

13. The memory storage device according to claim 12, wherein the memory controller is further configured to merge valid data belonging to the third logical address and move the first pointer to a fifth physical programing unit, wherein programming sequence of the fifth physical programing unit follows the fourth physical programing unit.

14. The memory storage device according to claim 13, wherein after data in the fifth physical programing unit is merged, the memory controller is further configured to move the first pointer to a sixth physical programing unit, wherein programming sequence of the sixth physical programing unit follows the fifth physical programing unit, if the first pointer is pointed at a physical programing unit having last programming sequence in the first buffer area, the memory controller is further configured to determine whether the second pointer is pointed at a physical programing unit having last programming sequence in the second buffer area, and if the second pointer is pointed at the physical programing unit having the last programming sequence in the second buffer area, the memory controller is further configured to move the first pointer to a physical programing unit having first programming sequence in the second buffer area.

15. The memory storage device according to claim 9, wherein the predetermined value is a size of one of the physical programing units.

16. The memory storage device according to claim 9, wherein a size of the first buffer area is equal to a size of the second buffer area.

17. A memory controller, for controlling a rewritable non-volatile memory module, the memory controller comprising: a host interface, configured to couple to a host system; a memory interface, configured to couple to the rewritable non-volatile memory module, wherein the rewritable non-volatile memory module comprises a plurality of physical erasing units, each of the physical erasing units comprises a plurality of physical programing units, and the physical erasing units are grouped into at least a data area;
and a memory management circuit, coupled to the host interface and the memory interface, wherein the memory management circuit is configured to configure a plurality of logical addresses to map to the physical erasing units in the data area, group at least one physical erasing unit among the physical erasing units besides the physical erasing units in the data area into a first buffer area, and group at least one physical erasing unit among the physical erasing units besides the physical erasing units in the data area into a second buffer area, wherein the at least one physical erasing unit of the first buffer area is different from the at least one physical erasing unit of the second buffer area, wherein the memory management circuit is configured to receive a first write command, wherein the first write command instructs to write a first data to a first logical address among the logical addresses, and the memory management circuit is configured to determine whether a quantity of the first data is smaller than a predetermined value,
if the quantity of the first data is smaller than the predetermined value, memory management circuit is configured to write the first data into the at least one physical erasing unit of the first buffer area or the at least one physical erasing unit of the second buffer area,
if the memory management circuit writes the first data into the at least one physical erasing unit of the second buffer area, the memory management circuit obtains at least one second logical address mapped to at least one first physical programing unit in the at least one physical erasing unit of the first buffer area and copies merges valid data belonging to the at least one second logical address into a third physical erasing unit among the physical erasing units, wherein the number of the at least one second logical address is smaller than a merging threshold number and the third physical erasing unit is different from the at least one physical erasing unit of the first buffer area and the at least one physical erasing unit of the second buffer area.

18. The memory controller according to claim 17, wherein the memory management circuit is further configured to set up a first pointer and a second pointer and points the first pointer and the second pointer at one of the physical programing units in the at least one physical erasing unit of the first buffer area or the at least one physical erasing unit of the second buffer area.

19. The memory controller according to claim 18, wherein if the quantity of the first data is smaller than the predetermined value, the memory management circuit is further configured to write the first data into a second physical programing unit pointed by the second pointer and moves the second pointer to a third physical programing unit, wherein programming sequence of the third physical programing unit follows the second physical programing unit.

20. The memory controller according to claim 18, wherein the memory management circuit is further configured to obtain the at least one first physical programing unit according to a physical programing unit pointed by the first pointer, move the first pointer to a fourth physical programing unit, and obtain a third logical address mapped to the fourth physical programing unit.

21. The memory controller according to claim 20, wherein the memory management circuit is further configured to merge valid data belonging to the third logical address and moves the first pointer to a fifth physical programing unit, wherein programming sequence of the fifth physical programing unit follows the fourth physical programing unit.

22. The memory controller according to claim 21, wherein after data in the fifth physical programing unit is merged, the memory management circuit is further configured to move the first pointer to a sixth physical programing unit, wherein programming sequence of the sixth physical programing unit follows the fifth physical programing unit,
if the first pointer is pointed at a physical programing unit having last programming sequence in the first buffer area, the memory management circuit is further configured to determine whether the second pointer is pointed at a physical programing unit having last programming sequence in the second buffer area, and if the second pointer is pointed at the physical programing unit having the last programming sequence in the second buffer area, the memory management circuit is further configured to move the first pointer to a physical programing unit having first programming sequence in the second buffer area.

23. The memory controller according to claim 17, wherein the predetermined value is a size of one of the physical programing units.

24. The memory controller according to claim 17, wherein a size of the first buffer area is equal to a size of the second buffer area.

* * * * *